United States Patent [19]

Nordstrom

[11] 3,995,562
[45] Dec. 7, 1976

[54] CARGO PALLET LOCK

[76] Inventor: Arnold B. Nordstrom, 3855 Paseo de las Tortugas, Torrance, Calif. 90505

[22] Filed: Aug. 18, 1975

[21] Appl. No.: 605,668

[52] U.S. Cl. .................. 105/465; 244/118 R; 248/119 R
[51] Int. Cl.² ....................................... B60P 7/08
[58] Field of Search ....... 105/463, 464, 465, 366 B; 244/118 R; 248/119 R, 361 R

[56] References Cited
UNITED STATES PATENTS

| | | | |
|---|---|---|---|
| 3,306,234 | 2/1967 | Hansen et al. | 105/465 |
| 3,693,920 | 9/1972 | Trautman | 248/119 R |
| 3,698,679 | 10/1972 | Lang et al. | 105/465 |
| 3,796,397 | 3/1974 | Alberti | 244/118 R |
| 3,800,713 | 4/1974 | Nordstrom | 105/465 |

Primary Examiner—Milton S. Mehr
Attorney, Agent, or Firm—John Holtrichter, Jr.

[57] ABSTRACT

A cargo pallet lock for use in vehicles such as aircraft, trucks, ships and the like, as a means to secure load supporting members or pallets to accommodating floor structures in the vehicles and includes a pallet restraint member with a T-shaped head which is pivotally mounted in a lock housing structure detachably positioned on a vehicle's floor structure, the restraint member being biased in a pallet-engaging elevated position and including a unitary latch-release mechanism for releasably and automatically locking the restraint member in either its elevated or retracted configurations.

9 Claims, 9 Drawing Figures

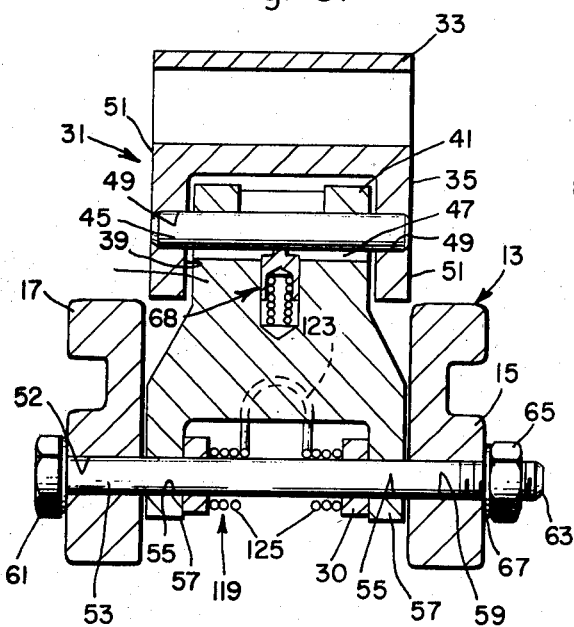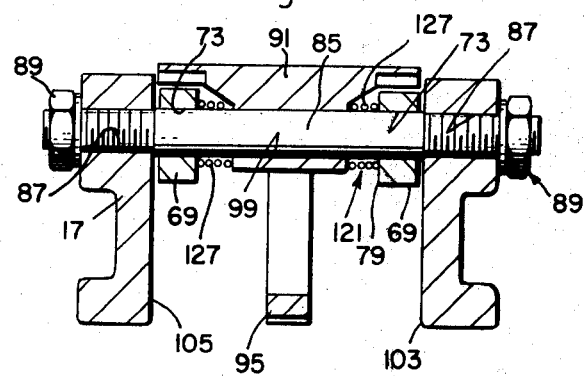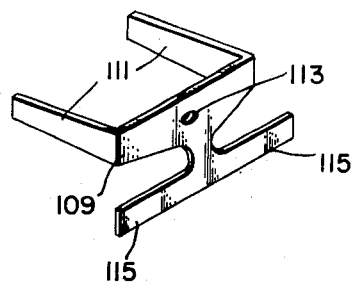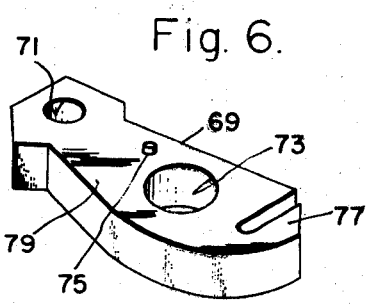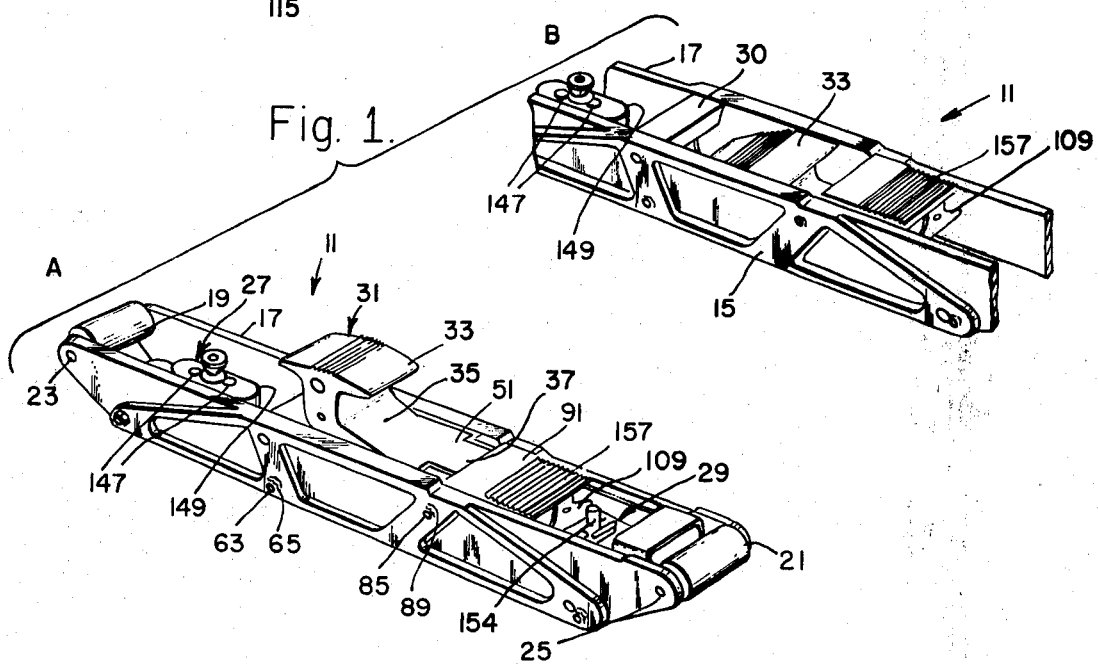

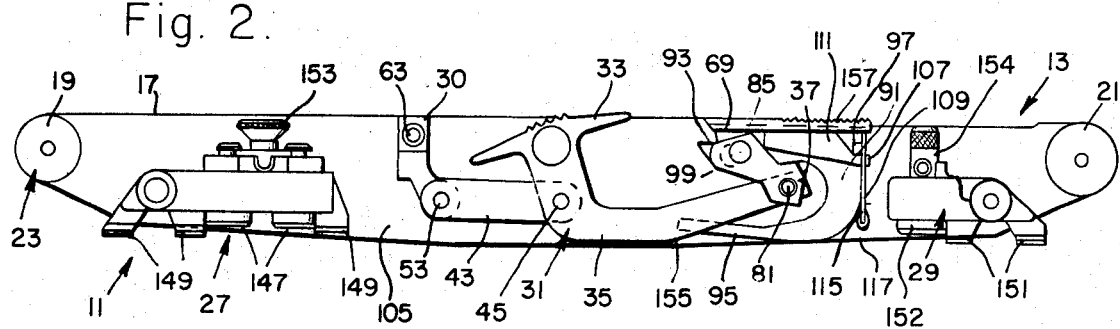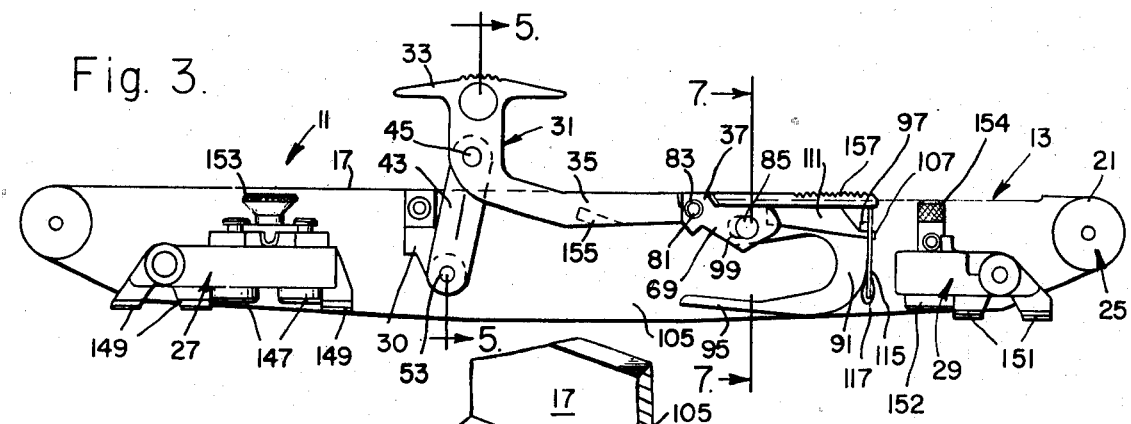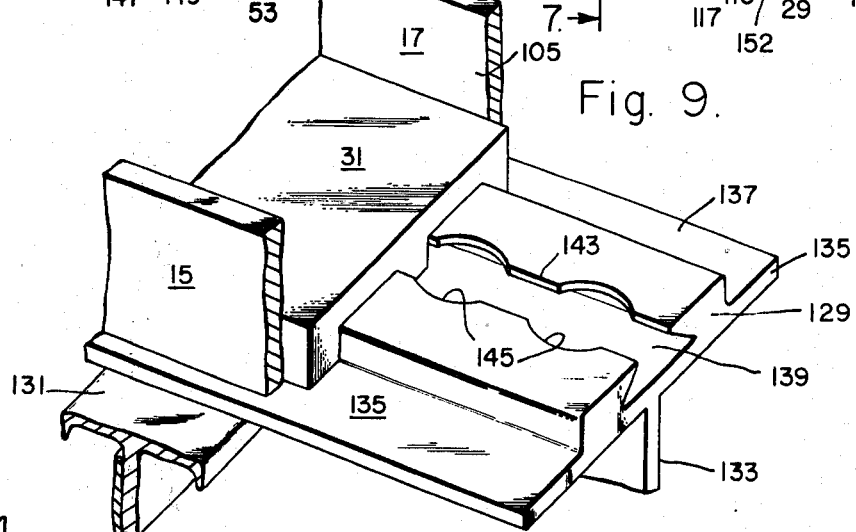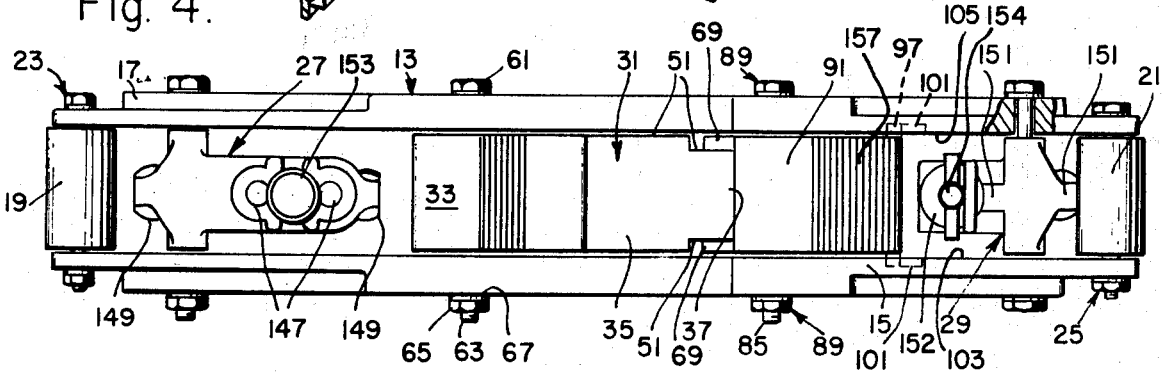

CARGO PALLET LOCK

BACKGROUND OF THE INVENTION

The background of the invention will be set forth in two parts.

FIELD OF THE INVENTION

The present invention pertains generally to the field of cargo transportation and more particularly to cargo pallet locks for securing load supporting members in vehicles, but is particularly adapted for use in aircraft.

DESCRIPTION OF THE PRIOR ART

When a vehicle is used to transport cargo, it is desirable that the load be containerized or palletized to facilitate rapid loading and removal of the cargo from the vehicle, especially aircraft. When the cargo is in the aircraft, it is very important that the pallet be securely fastened to the floor structure of the craft to prevent shifting of the load and consequent damage to the craft itself, its crew, and to the cargo transported therein during normal flight conditions, including in-flight gust loading as well as adverse landing conditions and otherwise survivable crash conditions.

It is often necessary or desirable to use some aircraft for both cargo and passenger service. Of course, when an airplane is being used for transporting cargo, it is desirable to have a major portion of the floor of the plane open to receive the cargo. In converting an aircraft from cargo to passenger service, it is necessary to install seats on the floor area which had heretofore been used for cargo. Prior art convertible aircraft of this type have a major drawback in that considerable time is required to convert the vehicle from cargo to passenger service. One of the primary reasons for this is that portions of the pallet supporting structure of the aircraft had to be removed to allow installation of the seats. The seats are then installed individually which requires additional time. This waste of time is particularly significant when the particular aircraft must be frequently converted between passenger and cargo service. Of course, a similar situation exists when converting a passenger service aircraft to cargo service.

It has been found that aircraft can be more rapidly changed from cargo to passenger configurations and vice versa by palletizing the passenger seats, utilizing a pallet supporting structure which will receive either or both cargo pallets and seat pallets, and by providing an extendable and retractable lock mechanism for securing the pallets to the aircraft's floor structure. It is of course very important that pallets be securely fastened to the vehicle. For example, in the case of a loose cargo pallet, damage to the cargo or to the aircraft, or injury to the aircraft's crew may result therefrom.

Many systems of the type described employ a plurality of tracks having rollers thereon over which the seat and/or cargo pallet may be easily rolled into position. The pallets are held in selected positions along the tracks, in part, by several latching means or lock assemblies, each of which has a latching member that is engageable with a transverse edge of the pallet. In the more advantageous of these systems, the latching members are movable to a retracted position so that the pallets may be moved thereover without interference. Each of the latching members is usually a unitary part and when moved to the locking position, can be utilized simultaneously to restrain two adjacent pallets. The retractable latching means disclosed by the earlier prior art to secure adjacent pallets have been extremely costly structures with interlocking latchable parts to perform the locking function. Later, there was developed a latch having a solid T-member rotatable to its engaged position below the top of the roller means.

Although the rotatable T-member configuration is an improvement over the complex structures of the earlier art, the latching member has to be manually rotated and lifted to its elevated position and then locked thereat by a separate manual movement of the latching member. The locking assembly must then be moved longitudinally along the track to which it is attached until the latching member engages a transverse end of a pallet. In order to release the locking assembly, the latching member has to be pushed out of its locked position and the lock pulled away from the pallet before the member can be manually rotated to its retracted position.

An advancement of the art has been described in U.S. Pat. No. 3,800,713 issued Apr. 2, 1974, to the applicant of the present application, in which a T-headed pallet-engaging lock post is slidably mounted in a body member and retracted to a position within the body member against a self-contained bias force by manual operation of a separate retract lever.

SUMMARY OF THE INVENTION

In view of the foregoing factors and conditions characteristic of the prior art, it is a primary object of the present invention to provide a new and improved cargo pallet lock for releasably securing load supporting members in vehicles having supporting floor structures.

Another object of the present invention is to provide a cargo pallet lock including a T-shaped pallet restraint head that simultaneously engages two adjacent cargo pallets.

Still another object of the present invention is to provide a cargo pallet lock having a pivotally mounted pallet restraint member that is biased in an elevated and locked pallet-engaging position and which may be manually unlocked and retracted against the bias force and automatically locked in its retracted position by manipulation of a unitary latch-release mechanism.

Yet another object of the present invention is to provide a cargo pallet lock in which a spring-loaded pivotally-mounted pallet restraint member includes a T-shaped pallet restraint head that moves horizontally a sufficient distance to clear an associated pallet before moving downwardly to its retracted position below the pallet whereby a pallet may be engaged and disengaged without requiring movement of the cargo pallet lock.

A further object of the present invention is to provide a cargo pallet lock having a pallet restraint member pivotally mounted in a housing structure and biased in an elevated pallet-engaging position, and from which position it may be retracted, after being released, by a downward pressure on the T-shaped head of the restraint member.

According to the present invention, a cargo pallet lock is provided for securing a load supporting member in a vehicle having a supporting floor structure, the lock including a housing structure securable to the floor structure below the load supporting surface thereof and adjacent the load supporting member and guide means associated with the housing structure and a pallet restraint member for pivotally supporting the pallet restraint member in the housing structure between an elevated position and a retracted position. In the elevated position, the pallet restraint member extends above the housing structure at least partially into the plane and lockably engageable with the load supporting member, while the pallet restraint member lies below the load supporting member when in its retracted position. The cargo pallet lock also includes bias means mounted in the housing structure and engaging the pallet restraint member for biasing the pallet restraint member toward its elevated position, and further includes latch-release means mounted in the housing structure and engageable with the pallet restraint member for releasably locking the pallet restraint member in its elevated position and in its retracted position.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings in which like reference characters refer to like elements in the several views.

BRIEF DESCRIPTION OF THE DRAWINGS

FIG. 1A is a perspective view of a cargo pallet lock constructed in accordance with the present invention illustrated in its elevated position;

FIG. 1B is a perspective illustration showing a portion of the cargo pallet lock of FIG. 1A in its retracted position;

FIG. 2 is a sectional representation in elevation of the cargo pallet lock of FIG. 1B in its retracted configuration;

FIG. 3 is an elevational view similar to that of FIG. 2, showing the lock in its elevated configuration;

FIG. 4 is a plan view of the upper portion of the lock of FIG. 1A;

FIG. 5 is a sectional view of the lock taken along line 5—5 in FIG. 3;

FIG. 6 is a perspective view of one of the latch links seen in FIGS. 2 and 3;

FIG. 7 is a sectional view of the lock taken along line 7—7 in FIG. 3;

FIG. 8 is a perspective view of the latch spring shown in FIGS. 2 and 3; and

FIG. 9 is an enlarged perspective illustration of the aft portion of the pallet lock mounted on a track.

DESCRIPTION OF THE PREFERRED EMBODIMENT

Referring now to the drawing and more particularly to FIGS. 1–4, there is shown a cargo pallet lock 11 including a housing structure 13 with a pair of side plates 15 and 17 held in spaced apart relationship by suitable spacing structure such as forward and aft spacing members 19 and 21, and associated threaded bolt assemblies 23 and 25, respectively, as well as other structure to be more fully described hereinafter, such as a forward pallet lock fitting assembly 27, an aft pallet lock fitting assembly 29, and an intermediate spacer block 30, for example.

Between the side plates 15 and 17 is movably disposed a pallet restraint member 31 having a T-shaped pallet restraint head portion 33, a curved neck portion 35, and an end portion 37. The neck portion 35 is provided with a trough 39 in its forward lower face to accommodate an upper end 41 of an inverted Y-shaped head link 43, as best seen in FIG. 5. The link 43 supports the forward part of the pallet restraint member 31 by means of a movable pivot 45 extending through a slot 47 in the link 43 and seated at its end in aligned holes 49 provided in the sides 51 of the neck portion 35, while the fixed pivot 53 extends through holes 55 in the arms 57 of the head link 43 and through holes 59 in the side plates 15 and 17. As shown in FIG. 5, the fixed pivot 53 may be a bolt having a head 61 and an end 63 threadably engaging a nut 65 with a lock washer 67 disposed between the housing and the nut. This figure also illustrates a movable pivot retaining mechanism 68 including a piston with an axial pin extending into a small hole in the pivot 45, as urged by a coil spring seated in a bore in the link 43.

The rear part of the pallet restraint member 31 is supported by a pair of specially configured spaced latch links 69, each having a forward guide pin hole 71 and a fixed guide pin hole 73, as best viewed in FIG. 6. As will be described in more detail subsequently, each of the latch links 69 are also provided with an inwardly protruding, spring-anchoring dog 75 and a recocking ramp segment 77 in an inner link surface 79. A latch link 69 is disposed adjacent each of the sides 51 of the pallet restraint member 31 and each is supported at its forward end by a movable guide pin 81 extending through the holes 71 and through a hole 83 in the pallet restraining member's neck portion 35 adjacent its end 37 (see FIG. 3). The opposite ends of the latch link 69 pivot on a fixed guide pin 85 extending through the holes 73 and through holes 87 in the housing's side plates 15 and 17, as shown in FIG. 7. The ends of the fixed guide pin 85 may be threaded and extend beyond the side plates where appropriate nut and lock washer assemblies 89 may be mounted.

In again viewing FIGS. 1 and 2, it may be seen that there is also movably disposed between the housing's side plates 15 and 17 a latch lock member 91. This member includes a lock notch 93 adjacent a forward end 94, a lower forward extending arm portion 95, a pair of transversely extending guide lugs 97, and an oblong hole 99 in the upper portion of the member adjacent the notch 93. The guide lugs 97 extend into guide slots 101 in the inner surfaces 103 and 105 of the side plates 15 and 17 respectively, to support the rear portion of the member 91 while allowing it to move horizontally in a forward and backward direction as limited by the fixed guide pin 85 passing through the oblong hole 99. Attached to the rear of the latch lock member 91 by means of a rearwardly extending post 107 is a latch spring 109 of 1095 sheet steel, for example, and having a pair of spaced, forwardly extending arms 111, a hole 113 to accommodate the post 107, and a pair of transverse lower arms 115 extending into recesses 117 in the respective inner surfaces 103 and 105 of the side plates 15 and 17 to bias the lock latch member 91 in its forward position. An enlarged perspective view of the latch spring 109 is shown in FIG. 8.

The pallet restraint member 31 is movable, by means of the forward-positioned Y-shaped link 43 and the aft-positioned latch links 69, between an elevated pallet-engaging position and a recessed position, as exemplified by the configurations shown in FIGS. 3 and 2, respectively. The member 31 is biased toward the elevated position by a forward pivot spring 119 and by aft pivot springs 121. The forward spring 119, as best viewed in FIG. 5, includes a U-shaped central portion 123 between two coil portions 125 mounted about the fixed pivot 53 and anchored to the spacer blocks 30. Although the spring 119 is shown as one continuous element, it may have other conventional configurations such as two separate coil springs mounted on the pivot 53 and each having an arm engaging the link 43 and an opposite arm anchored to an associated spacer block 30.

FIG. 7 best illustrates the preferred configuration of the aft springs 121 which include coil portions 127 mounted about the fixed guide pin 85 on each side of the latch lock member 91. The springs 121 also include arms (not shown) which engage the dogs 75 on the latch links 69 shown in FIG. 6. Although not critical, the springs preferably are preloaded to exert about 4 to 6 pounds of pressure, and they may be fabricated from any suitable spring stock.

The cargo pallet lock 11 is adapted to be movably attached to a conventional track 129 that is supported on spaced transverse or lateral floor beams 131 (only one beam 131 being shown in FIG. 9). The track 129 may include a lower vertical portion 133, a flange base portion 135 with an upper surface 137, and a longitudinal track groove 139 defined by a central raised portion 141 having a longitudinal slot 143 therealong. For purposes of attaching various fixtures and pallet locks to the tracks, uniformly spaced apertures or curved notches 145 are provided along the slot 143, the apertures being spaced and dimensioned to register with a pair of longitudinally aligned forward plungers 147 movably supported in the forward pallet lock fitting assembly 27, as shown in FIGS. 1–4, for example. The fitting assembly 27 also includes depending flanged restraint arms 149 which are similar to a pair of depending arms 151 that are a part of the aft pallet lock fitting assembly 29, this assembly also including a single plunger 152.

The special relationship of the plungers 147, 152 and the arms 149 and 151 is such that the lower flange portions of the arms are positioned in the groove 139 intermediate the apertures 145 when the plungers 147, 152 are in their normal position extending into the groove 139 through the apertures 145. The plungers are spring loaded in their normal downwardly extending position but may be raised to allow longitudinal movement of the lock 11 for release of the arms 149 and 151 through the apertures 145 by lifting a handle 153 in the forward fitting assembly 27 and a handle 154 in the aft fitting assembly 29. The body portion of the forward fitting assembly may be an investment casting and is designed so that the plungers 147 take all the fore and aft loads while the arms 149 of the assembly 27 and the arms 151 of the aft fitting assembly 29 take only the vertical loads and the side loads.

In a presently preferred embodiment of the invention, a clearance distance of about 0.03 inch is provided between the upper surface 137 of the flange portion 135 and the lower edge of the side plates 15 and 17. Also, a 0.06 inch clearance is provided between the upper edge of the side plates and the lower planar surface of the cargo pallets (not shown) to be locked in place by the lock 11. A more complete description of pallet lock fitting assemblies of the type shown herein may be obtained by referring to the aforementioned U.S. Pat. No. 3,800,713.

The operation of the cargo pallet lock 11 may best be understood by starting with the lock in its retracted position as illustrated in FIG. 2. Here, the pallet restraint member 31 is held within the housing structure 13, against the bias forces of the forward and aft springs 119 and 121, by action of the latch lock member's arm portion 95 engaging a notch 155 in the lower surface of the restraint member's curved neck portion 35. After moving a pallet into position just behind a pallet to be locked in place and attaching it to the track 129 by manipulating the forward and aft fitting assemblies 27 and 29, the pallet restraint member 31 may be erected through a single foot motion by stepping on a serrated upper surface 157 of the latch lock member 91 and moving it aft approximately one-eighth inch against the bias of the latch spring's transverse lower arms 115. This movement causes the lock member's arm portion 95 to pull out of the notch 155 so that the forward and aft springs 119 and 121, mounted on the two respective pivot axes, will move the pallet restraint member 31, with its T-shaped head portion 33, into its elevated pallet-engaging position as shown in FIG. 3. As foot pressure is removed from the surface 157, the member 91 returns to its normal forward position by action of the latch spring 109.

When the end portion 37 of the restraint member 31 approaches its uppermost position, as guided by the two latch links 69, it strikes the forward end 94 of the latch lock member 91 and forces this member backward against the bias of the latch spring 109 until the end portion 37 reaches the lock notch 93. This new relationship allows the lock member 91 to move forward under the bias force of the latch spring's transverse arms 115 so that the restraint member's end 37 is in the notch 93 to automatically lock the pallet restraint member in its elevated position. In this position, the pallet restraint head portion 33 will restrain the forward positioned pallet and also it will engage a subsequently positioned pallet since its head portion has both upstream and downstream facing flanges.

After removing the upstream or subsequently positioned pallet, the pallet restraint member 31 may be simply moved to its retracted position by two motions of an operator's foot. The first is to move the serrated surface 157 of the lock member 91 to its aft "unlatched" position. The lock member is now temporarily locked in this position by the action of the two outwardly-biased upper arms 111 of the latch spring 109, the latter arms being moved back along the respective inner surfaces 79 of the latch links 69 until they snap into the recocking ramp segment depressions 77 incorporated in these links. This is a spring loaded detent function of the unique latch spring-latch links arrangement.

The pallet restraint member 31 may now be moved to its retracted position by stepping on its head portion 33 until it is flush with the upper edges of the side plates 15 and 17. At this point, the latch links 69 will have pivoted to positions whereby the respective upper latch spring arms 111 have ridden up the recocking ramp portions 77 of the latch links 69 to again lie against the inner link surfaces 79 and thus allow the latch lock member 91 to move forward to its normal position as urged by the lower arms 115 of the spring 109. This forward movement of the member 91 now causes the outer tip of its arm portion 95 to again engage the notch 155 in the restraint member 31 to automatically lock the restraint member in place in its retracted position. Thus it can be seen that the depressing of the restraint member 31 into the housing 13 acts both to energize (wind up) the two restraint member raising springs 119 and 121 in preparation for the next operation, and to release the latch lock member 91 from its unlatched position so that it will releasably lock the restraint member 31 in its lowered position.

In a typical utilization of the present invention in a cargo-carrying vehicle such as an aircraft, for example, a cargo pallet is moved through a door opening of the vehicle onto a conventional ball mat and then pushed along rollers positioned adjacent recessed tracks in a direction generally parallel to the longitudinal axis of the craft to the farthest extent possible, either forward or aft depending on whether the cargo loading door is located in the rear or forward part of the vehicle. At the end of the desired travel, the first of such pallets in a column is retained at its upstream end by usually two or more conventional fixed terminal locks mounted on associated tracks. As the pallet moves over the recessed tracks, it also passes over any cargo pallet locks 11 that are releasably attached to the tracks, the locks being in their retracted configuraion.

Once the pallet reaches the terminal locks, the loading personnel need only step on the upper surface 157 of the latch locked member 91 of a properly positioned lock 11 and move it slightly backward to release the pallet restraint member 31 so that it will automatically move upward and forward along a predetermined linkage-controlled path to engage and restrain the pallet from upstream and vertical movement. It should again be noted that the above-mentioned path is determined by the pivot link members 43 and 69 which cause the T-shaped head portion 33 to first reach its maximum height before reaching its maximum longitudinal forward travel so that the forward flange portion of the head 33 will clear the trailing transverse edge of the cargo pallet and not be obstructed by it.

The next pallet is then pushed along the path of the tracks over the retracted locks 11 until its upstream end engages the first lock or set of parallel locks 11 in their elevated configuration. At this point, the next lock or set of parallel locks are activated to restrict the vertical and longitudinal movement of the pallet, and so on until all the pallets are secure. Of course in the unloading operation, the locks 11 are foot operated as previously described to first move rearwardly to disengage from the pallets and thereafater to retract below the plane of the pallet's lower surface.

The materials and manufacturing processes used in fabricating the various components of the invention are not considered critical and any material and process known to be satisfactory to produce these components may be utilized. For example, the housing side plates may be machine forgings and such components as the forward and aft spacing members 19 and 21, the pallet restraint members 31, the links 43 and 69, the latch lock member 91 and the body portion of the forward and aft fittings 27 and 29 may be investment castings of 17-4 PH material.

From the foregoing, it should be evident that there has been described a cargo pallet lock having an easily released and recessed pallet engaging restraint member that follows a predetermined pivotal link defined path and which is automatically locked in either its elevated or recessed position.

Although an exemplary embodiment of the invention has been shown and described in detail, it should be understood that changes and modifications and additional embodiments to and of the invention may be made by one having ordinary skills in the art, without departing from the spirit and scope of the invention.

I claim:

1. A cargo pallet lock for securing a load supporting member in a vehicle having a supporting floor sturcture, comprising:
    a pallet restraint member;
    a housing structure securable to the floor structure below the load supporting surface thereof and adjacent the load supporting member;
    guide means associated with said housing structure and said pallet restraint member for pivotally supporting said pallet restraint member in said housing structure between an elevated position wherein said pallet restraint member extends above said housing structure at least partially into the plane of and lockably engageable with the load supporting member, and a retracted position wherein said pallet restraint member lies below the load supporting member;
    bias means mounted in said housing structure and engaging said pallet restraint member for biasing said pallet restraint member toward said elevated position; and
    latch-release means mounted in said housing structure and engageable with said pallet restraint member for releasably locking said pallet restraint member in said elevated position and in said retracted position.

2. The cargo pallet lock according to claim 1, wherein said pallet restraint member includes an upper pallet engaging head portion, and wherein said guide means includes a forward support link structure and a rear support link structure, said link structures defining a pallet restraint member link-controlled path whereby said head portion of said pallet restraint member reaches its maximum height before reaching its maximum longitudinal forward travel when said pallet restraint member moves from said retracted position to said elevated position.

3. The cargo pallet lock according to claim 1, wherein said pallet restraint member includes a holding structure, and wherein said latch-release means includes a movably mounted latch lock member having a portion removably engageable in said holding structure to releasably hold said pallet restraint member in said retracted position against the force of said bias means.

4. The cargo pallet lock according to claim 1, also comprising restraint member locking means associated with said pallet restraint member, said guide means and said latch-release means for transferring rearwardly-directed horizontal load forces incident on said pallet restraint member through said latch-release means to said housing structure when said pallet restraint member is in said elevated position.

5. The cargo pallet lock according to claim 1, wherein said latch-release means includes latch lock bias means engaging said housing structure for biasing said latch-release means toward a forward pallet restraint member-elevated locking and retracted restraining position.

6. The cargo pallet lock according to claim 5, wherein said guide means includes a forward support link structure and a rear support link structure, and wherein said latch lock bias means includes a forward portion engaging said rear support link structure for holding said latch-release means in an unlatched position when said latch-release means is manually moved aft to an unlatched position only until said pallet restraint member is manually moved thereafter to said retracted position.

7. The cargo pallet lock according to claim 6, wherein said rear support link structure includes a pair of spaced latch links with forward and rear pivots, said latch links each including a recocking ramp segment in an inner link surface aft of said rear pivot, said forward portion of said latch lock bias means including two spaced apart arms each engaging a different one of said inner link surfaces and engageable with said recocking ramp when said latch-release means is moved to said unlatched position.

8. The cargo pallet lock according to claim 3, wherein said latch-release means includes a latch lock member having an upper manually-engageable actuating portion, horizontally movable-anchoring portions, and a lower forwardly-extending arm portion removably engageable in said holding structure of said pallet restraint member.

9. The cargo pallet lock according to claim 7, wherein said latch lock bias means is a unitary structure having oppositely extending transverse arms engaging said housing structure biasing said latch-release means toward a forward position and also having said two spaced apart arms extending forwardly engaging a different one of said latch links.

* * * * *